(12) United States Patent
Suzumura et al.

(10) Patent No.: US 10,882,569 B2
(45) Date of Patent: Jan. 5, 2021

(54) VEHICLE BODY REINFORCING STRUCTURE AND MANUFACTURING METHOD OF VEHICLE BODY REINFORCING STRUCTURE

(71) Applicant: Toyota Jidosha Kabushiki Kaisha, Toyota (JP)

(72) Inventors: Haruki Suzumura, Kariya (JP); Hiroshi Kuno, Kariya (JP); Tomoki Kitagawa, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 122 days.

(21) Appl. No.: 16/361,942

(22) Filed: Mar. 22, 2019

(65) Prior Publication Data

US 2019/0300073 A1 Oct. 3, 2019

(30) Foreign Application Priority Data

Mar. 28, 2018 (JP) .................................. 2018-062747

(51) Int. Cl.
*B60J 5/00* (2006.01)
*B62D 29/00* (2006.01)
(Continued)

(52) U.S. Cl.
CPC ............ *B62D 29/005* (2013.01); *B60J 5/101* (2013.01); *B62D 25/025* (2013.01); *B62D 25/04* (2013.01); *B62D 29/002* (2013.01)

(58) Field of Classification Search
CPC .. B62D 25/025; B62D 25/2036; B62D 25/04; B62D 25/087; B29K 2105/06;
(Continued)

(56) References Cited

U.S. PATENT DOCUMENTS 4,130,614 A * 12/1978 Saidla .................... B29C 44/145
264/257
5,395,153 A * 3/1995 De Smet ................. B60J 5/0426
296/146.6
(Continued)

FOREIGN PATENT DOCUMENTS

JP 2005-186751 A 7/2005
JP 2005-319662 A 11/2005
(Continued)

*Primary Examiner* — Kiran B Patel
(74) *Attorney, Agent, or Firm* — Dinsmore & Shohl LLP (57) ABSTRACT

A vehicle body reinforcing structure includes: a panel-shaped reinforcing member having a through-hole penetrating through the reinforcing member in a plate-thickness direction of the reinforcing member and located inside a closed-section structure of a vehicle body framework portion; a first panel located at a position closer to an outside of the vehicle than the reinforcing member is; a second panel constituting the closed-section structure with the first panel and located at a position closer to an inside of the vehicle than the reinforcing member is; and a foaming adhesive member filled in an internal space of the closed-section structure, wherein the first panel and the second panel are bonded to each other by the foaming adhesive member penetrating through the through-hole of the reinforcing member, and the foaming adhesive member is filled between the first panel and the reinforcing member and between the second panel and the reinforcing member.

5 Claims, 4 Drawing Sheets (51) Int. Cl.
*B60J 5/10* (2006.01)
*B62D 25/02* (2006.01)
*B62D 25/04* (2006.01)

(58) Field of Classification Search
CPC ............. B29K 2309/08; Y10T 428/239; Y10T 428/24149; B29C 66/71; B29C 66/7212
See application file for complete search history.

(56) References Cited

U.S. PATENT DOCUMENTS

| | | | | |
|---|---|---|---|---|
| 5,518,806 | A * | 5/1996 | Eder | B29C 44/5636 181/288 |
| 5,755,486 | A * | 5/1998 | Wycech | B29C 70/78 296/187.02 |
| 5,884,960 | A * | 3/1999 | Wycech | B29C 44/1228 296/146.6 |
| 6,096,403 | A * | 8/2000 | Wycech | B29C 44/1228 428/122 |
| 6,168,226 | B1 * | 1/2001 | Wycech | B62D 29/007 296/146.6 |
| 6,199,940 | B1 * | 3/2001 | Hopton | B60J 5/0447 296/146.6 |
| 6,321,793 | B1 * | 11/2001 | Czaplicki | B29C 44/18 138/172 |
| 6,341,467 | B1 * | 1/2002 | Wycech | B29C 44/18 296/193.06 |
| 6,350,513 | B1 * | 2/2002 | Melquist | B32B 5/18 428/313.3 |
| 6,378,933 | B1 * | 4/2002 | Schoen | B62D 29/002 296/187.02 |
| 6,419,305 | B1 * | 7/2002 | Larsen | B62D 25/04 296/187.02 |
| 6,467,834 | B1 * | 10/2002 | Barz | B62D 25/04 296/187.02 |
| 6,471,285 | B1 * | 10/2002 | Czaplicki | B62D 29/002 296/187.02 |
| 6,519,854 | B2 * | 2/2003 | Blank | B62D 21/157 29/402.09 |
| 6,550,847 | B2 * | 4/2003 | Honda | B29C 44/1228 296/146.6 |
| 6,662,424 | B2 * | 12/2003 | Ehrlich | B60P 7/0815 29/428 |
| 6,866,331 | B2 * | 3/2005 | Kropfeld | B62D 29/002 296/146.6 |
| 6,883,858 | B2 * | 4/2005 | Barz | B62D 29/002 296/187.02 |
| 7,125,461 | B2 * | 10/2006 | Czaplicki | B62D 29/002 156/79 |
| 7,318,873 | B2 * | 1/2008 | Czaplicki | B29C 70/70 156/293 |
| 7,497,504 | B2 * | 3/2009 | Peters | B60J 5/0444 296/146.6 |
| 7,513,564 | B2 * | 4/2009 | Yamazaki | B62D 29/002 296/187.02 |
| 7,641,264 | B2 * | 1/2010 | Niezur | B62D 25/00 296/187.02 |
| 7,790,280 | B2 * | 9/2010 | Busseuil | B62D 25/00 296/187.01 |
| 8,042,768 | B2 * | 10/2011 | Liguore | B29C 70/088 244/119 |
| 8,297,675 | B2 * | 10/2012 | Someschan | B60R 13/02 264/46.5 |
| 8,511,743 | B2 * | 8/2013 | Kraushaar | B62D 21/15 296/187.02 |
| 8,608,232 | B2 * | 12/2013 | Engertsberger | B62D 25/04 296/187.12 |
| 8,690,228 | B2 * | 4/2014 | Marchesano | F16B 2/22 296/191 |
| 8,926,005 | B2 * | 1/2015 | Barz | B62D 25/04 296/193.06 |
| 9,120,276 | B2 * | 9/2015 | Wittenberg | B29C 70/885 |
| 9,702,391 | B2 * | 7/2017 | Erlacher | C09J 5/08 |
| 9,776,666 | B2 * | 10/2017 | Yamada | B62D 29/002 |
| 9,925,736 | B2 * | 3/2018 | Cox | B21B 1/22 |
| 9,944,325 | B2 * | 4/2018 | Murray | B60R 19/42 |
| 10,106,205 | B2 * | 10/2018 | Richardson | B29C 69/02 |
| 10,266,098 | B1 * | 4/2019 | Cox | B21C 23/00 |
| 10,363,974 | B2 * | 7/2019 | Cox | B62D 25/2054 |
| 10,556,413 | B2 * | 2/2020 | Cossins | B32B 3/12 |
| 2002/0033618 | A1 * | 3/2002 | Kwon | B62D 29/002 296/203.03 |
| 2003/0090129 | A1 * | 5/2003 | Riley | B62D 21/152 296/203.03 |
| 2004/0191107 | A1 * | 9/2004 | Ishikawa | B22F 7/006 419/2 |
| 2004/0217626 | A1 * | 11/2004 | Barz | B62D 25/04 296/187.02 |
| 2007/0090666 | A1 * | 4/2007 | Brennecke | B60J 5/0451 296/146.6 |
| 2008/0029200 | A1 * | 2/2008 | Sheasley | C08L 63/00 156/79 |
| 2009/0085379 | A1 * | 4/2009 | Takahashi | B62D 25/04 296/193.06 |
| 2013/0064666 | A1 * | 3/2013 | Thomas | B64C 27/72 416/158 |
| 2014/0084633 | A1 * | 3/2014 | Matsuda | B62D 25/02 296/203.01 |

FOREIGN PATENT DOCUMENTS

JP 2010-111328 A 5/2010
JP 2011-136606 A 7/2011

* cited by examiner

VEHICLE BODY REINFORCING STRUCTURE AND MANUFACTURING METHOD OF VEHICLE BODY REINFORCING STRUCTURE

CROSS-REFERENCE TO RELATED APPLICATIONS

This application claims priority to Japanese Patent Application No. 2018-062747 filed on Mar. 28, 2018, which is incorporated herein by reference in its entirety including the specification, drawings and abstract.

BACKGROUND

1. Technical Field

The disclosure relates to a vehicle body reinforcing structure and a manufacturing method of the vehicle body reinforcing structure.

2. Description of Related Art

As a vehicle body reinforcing structure for a vehicle such as an automobile, there is a reinforcing structure for a back door as described in Japanese Unexamined Patent Application Publication No. 2011-136606 (JP 2011-136606 A), for example. The reinforcing structure for the back door as described in JP 2011-136606 A includes an inner panel having a window frame portion (a vehicle body framework portion) for a back window glass, and metal hinge reinforcements disposed on the opposite side faces of the window frame portion so as to cover the window frame portion from its upper part to its lower part. Further, the reinforcing structure for the back door includes an upper outer panel and a lower outer panel placed on the inner panel via the hinge reinforcements so as to face each other at an interval in the height direction. The hinge reinforcements are placed inside an internal space of a closed-section structure constituted by the inner panel and the outer panels, so that the rigidity of the back door is increased by the hinge reinforcements.

SUMMARY

Some back doors have a structure bending near a border between the upper outer panel and the lower outer panel, that is, near the lower part of the window frame portion like JP 2011-136606 A. In a bending portion of the structure, sectional areas of the panels constituting the closed-section structure are small, so that it is requested to increase the rigidity of the bending portion. Further, as well as the back door, it is requested to increase the rigidity in a vehicle body framework portion such as a front pillar or a center pillar of a vehicle. As a method for increasing the rigidity, it is conceivable that the thicknesses of the inner panel, the outer panel, and the reinforcement are increased or more reinforcements are added. However, in this case, the weight of the reinforcing structure increases and the weight of a vehicle body increases, so this is unfavorable.

The disclosure provides a vehicle body reinforcing structure that can restrain an increase in weight and increase rigidity, and a manufacturing method of the vehicle body reinforcing structure.

A first aspect of the disclosure provides a vehicle body reinforcing structure. The vehicle body reinforcing structure includes: a reinforcing member having a through-hole penetrating through the reinforcing member in a plate-thickness direction of the reinforcing member, the reinforcing member being located inside a closed-section structure of a vehicle body framework portion of a vehicle, the reinforcing member being panel-shaped; a first panel located at a position closer to an outside of the vehicle than the reinforcing member is; a second panel constituting the closed-section structure together with the first panel, the second panel being located at a position closer to an inside of the vehicle than the reinforcing member is; and a foaming adhesive member filled in an internal space of the closed-section structure, wherein the first panel and the second panel are bonded to each other by the foaming adhesive member penetrating through the through-hole of the reinforcing member, and the foaming adhesive member is filled, in the internal space, between the first panel and the reinforcing member and between the second panel and the reinforcing member.

According to the above configuration, the foaming adhesive member penetrates through the through-holes of the reinforcing member. Accordingly, even in a structure in which the reinforcing member is placed between the first panel and the second panel, the first panel and the second panel can be bonded to each other with the foaming adhesive member. Since the reinforcing member is placed between the first panel and the second panel, a part between the first panel and the second panel can be reinforced by the foaming adhesive member, so that the rigidity of the vehicle body framework portion can be increased. Accordingly, in the vehicle body framework portion including the first panel, the second panel, the reinforcing member, and the foaming adhesive member, the rigidity of the vehicle body framework portion can be increased without adding reinforcing members or without increasing the plate thicknesses of the reinforcing member and the panels.

In the first aspect of the disclosure, the reinforcing member, the first panel, and the second panel may be arranged along a joining direction in which the first panel and the second panel are joined to each other, and the foaming adhesive member may extend along the joining direction between the first panel and the second panel.

According to the above configuration, the closed-section structure is easily crushed in the joining direction where the first panel and the second panel are joined to each other, but since the foaming adhesive member is provided to extend in the joining direction, the rigidity in the joining direction can be increased.

In the first aspect of the disclosure, the first panel may be an outer panel, the second panel may be an inner panel, and the reinforcing member may be a reinforcement. According to the above configuration, since the through-holes are provided in the reinforcement placed in the closed-section structure constituted by the inner panel and the outer panel and the foaming adhesive member is provided to penetrate through the through-holes, it is possible to increase the rigidity of the vehicle body framework portion using the reinforcement.

In the first aspect of the disclosure, the vehicle body reinforcing structure may include a plurality of the reinforcements. According to the above configuration, since the through-holes are provided in the reinforcements and the foaming adhesive member is provided to penetrate through the through-holes, it is possible to increase the rigidity of the vehicle body framework portion using the reinforcements.

A second aspect of the disclosure provides a manufacturing method of a vehicle body reinforcing structure. The manufacturing method of a vehicle body reinforcing structure includes: (a) placing a first panel, with a predetermined space between the first panel and a reinforcing member, at a position closer to an outside of a vehicle than the reinforcing member is, the reinforcing member being panel-shaped, the reinforcing member having a through-hole penetrating through the reinforcing member in a plate-thickness direction of the reinforcing member, and the reinforcing member being placed inside a closed-section structure of a vehicle body framework portion of the vehicle; (b) placing a second panel, with a predetermined space between the second panel and the reinforcing member, at a position closer to an inside of the vehicle than the reinforcing member is; (c) forming the closed-section structure, by step (a) and step (b), the second panel constituting the closed-section structure together with the first panel; (d) placing a precursor of a foaming adhesive member in an internal space of the closed-section structure; (e) after step (d), heating the precursor to foam; and (f) after step (e), causing the precursor to penetrate through the through-hole such that the foaming adhesive member is filled between the reinforcing member and the first panel and between the reinforcing member and the second panel.

According to the configuration, it is possible to cause the foaming precursor to penetrate through the through-holes by providing the through-holes in the reinforcing member. As a result, the foaming precursor reaches the first panel and the second panel between which the reinforcing member is sandwiched. Accordingly, the first panel and the second panel can be bonded to each other with the foaming adhesive member, when the precursor hardens to become the foaming adhesive member. Further, the foaming adhesive member can be filled between the reinforcing member and the first panel and between the reinforcing member and the second panel, by causing the foaming precursor to penetrate through the through-holes.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1A:
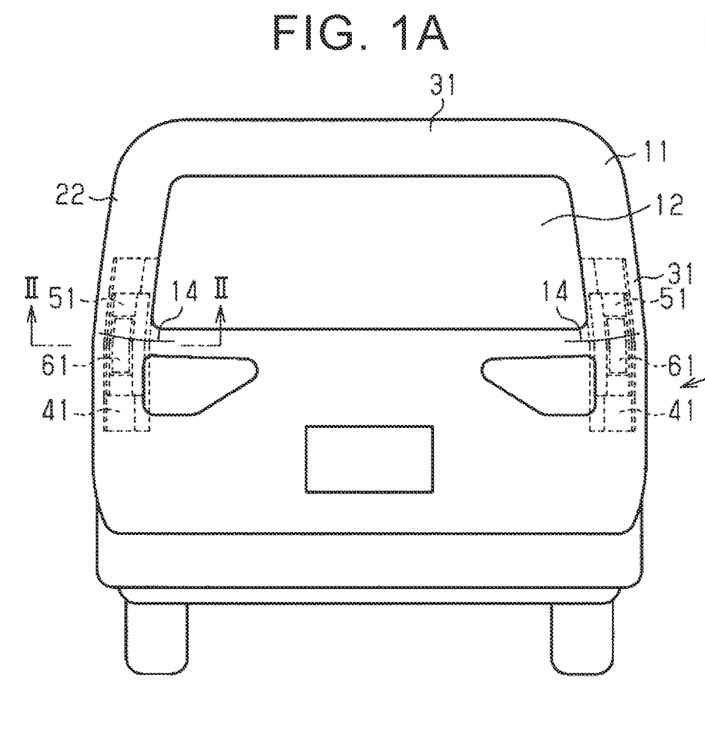
FIG. 1A is a front view illustrating a back door.
Figure 1B:
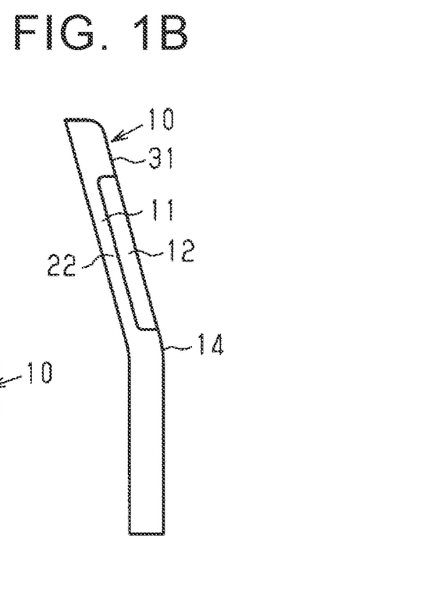
FIG. 1B is a side view illustrating the back door.

The following describes one embodiment in which a vehicle body reinforcing structure and a manufacturing method of the vehicle body reinforcing structure are embodied as a reinforcing structure for a back door and its manufacturing method, with reference to FIGS. 1A to 6. As illustrated in FIG. 1A, a back door 10 includes a back door frame 11 as a vehicle body framework portion, and a vehicle window panel 12. The back door frame 11 is made of aluminum. As illustrated in FIG. 1B, the back door 10 includes bending portions 14 at positions sandwiching the vehicle window panel 12 in the vehicle width direction. The back door 10 has a shape bending in the front-rear direction due to the bending portions 14.

Figure 2:
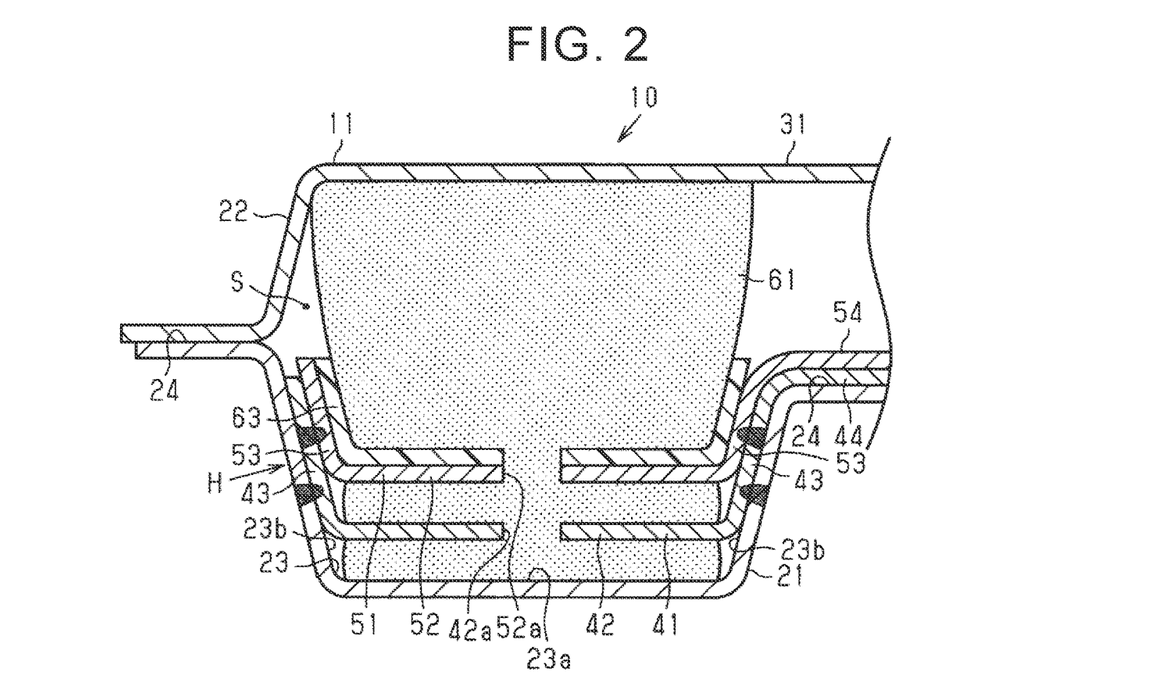
FIG. 2 is a sectional view taken along a line II-II in FIG. 1A and illustrating a reinforcing structure of the back door.

As illustrated in FIG. 2, the back door frame 11 includes an inner panel 21 placed on a side closer to the inside of a vehicle, and an outer panel 31 placed on a side closer to the outside of the vehicle. Further, the back door frame 11 includes a first reinforcement 41 and a second reinforcement 51 placed inside an internal space S of a closed-section structure H constituted by the inner panel 21 and the outer panel 31, and a high-rigidity foaming adhesive member 61. The high-rigidity foaming adhesive member 61 is placed to step over the bending portion 14. The outer panel 31 constitutes a first panel placed on the side closer to the outside of the vehicle than the first reinforcement 41 and the second reinforcement 51, and the inner panel 21 constitutes a second panel placed on the side closer to the inside of the vehicle than the first reinforcement 41 and the second reinforcement 51.

Figure 3:
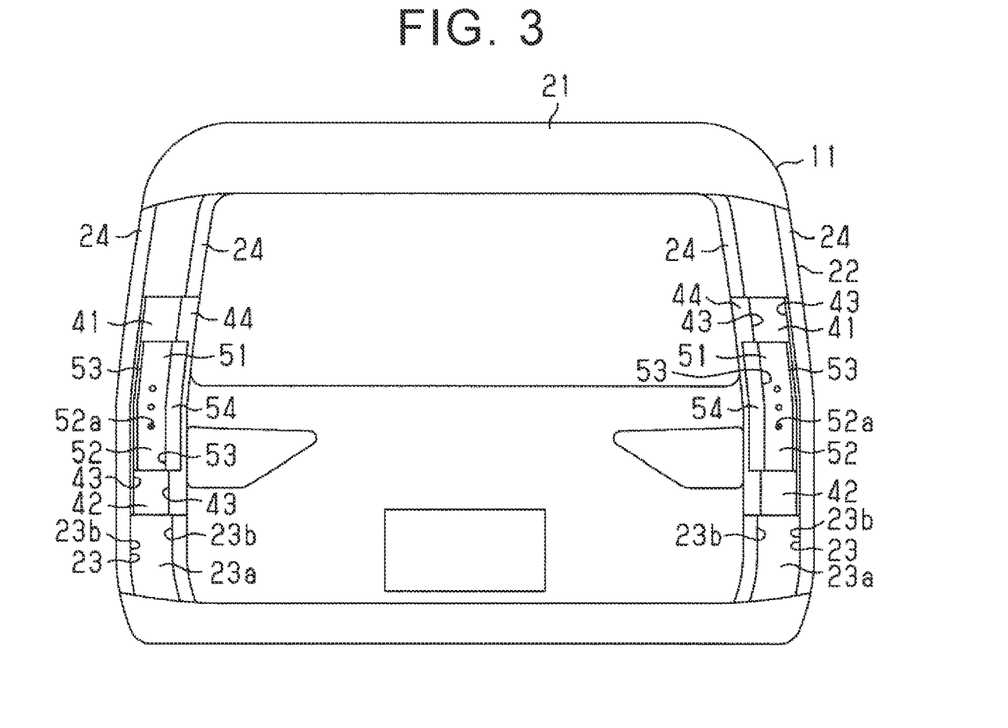
FIG. 3 is a front view illustrating a first reinforcement and a second reinforcement.

As illustrated in FIG. 2 or FIG. 3, the inner panel 21 is made of aluminum and includes a window frame portion 22. The inner panel 21 includes recessed portions 23 provided on the opposite sides of the inner panel 21 in the vehicle width direction and recessed toward the inside of the vehicle. Each of the recessed portions 23 extends in the vehicle up-down direction and is provided to step over its corresponding bending portion 14. The recessed portion 23 is defined by a bottom face 23a and side faces 23b extending toward the outside of the vehicle from edge portions, of the bottom face 23a, that extend in the up-down direction. Further, the inner panel 21 includes joining surfaces 24 extending in the vehicle width direction from the side faces 23b of the recessed portions 23.

The first reinforcement 41 and the second reinforcement 51 are partially placed in the recessed portion 23 of the inner panel 21. The first reinforcement 41 and the second reinforcement 51 are made of aluminum in a panel shape.

The first reinforcement 41 has a shape in which long sides extend in the vehicle up-down direction and has a generally hat-shaped section perpendicular to the longitudinal direction. The first reinforcement 41 includes a first bottom wall 42 in which long sides extend in the vehicle up-down direction, first side walls 43 projecting from long edges provided in a pair in the first bottom wall 42, and a first flange 44 extending from the first side wall 43 on the inner side in the vehicle width direction, out of the first side walls 43 thus provided in a pair.

The first reinforcement 41 includes a plurality of first through-holes 42a penetrating through the first bottom wall 42 in its plate-thickness direction. The first through-holes 42a are adjacently provided in the vehicle up-down direction. The first reinforcement 41 is placed in the inner panel 21 in a state where the first bottom wall 42 and the first side walls 43 are accommodated in the recessed portion 23. The first bottom wall 42 is distanced from the bottom face 23a of the recessed portion 23. The first side walls 43 are placed along the side faces 23b of the recessed portion 23. The first reinforcement 41 is joined to the inner panel 21 by welding the first side walls 43 thereto. Further, the first flange 44 of the first reinforcement 41 is joined by welding to the joining surface 24 of the inner panel 21 in a state where the first flange 44 is put thereon.

The second reinforcement 51 has a shape in which long sides extend in the vehicle up-down direction and has a generally hat-shaped section perpendicular to the longitudinal direction. The second reinforcement 51 includes a second bottom wall 52 in which long sides extend in the vehicle up-down direction, second side walls 53 projecting from long edges provided in a pair in the second bottom wall 52, and a second flange 54 extending from the second side wall 53 on the inner side in the vehicle width direction, out of the second side walls 53 thus provided in a pair. The second reinforcement 51 includes a plurality of second through-holes 52a penetrating through the second bottom wall 52 in its plate-thickness direction. The second through-holes 52a are adjacently provided in the vehicle up-down direction.

The second reinforcement 51 is placed in the inner panel 21 in a state where the second bottom wall 52 and the second side walls 53 are accommodated inside the first side walls 43 of the first reinforcement 41. Accordingly, the second reinforcement 51 is placed inside the first reinforcement 41 accommodated in the recessed portion 23. The second bottom wall 52 is distanced from the first bottom wall 42 of the first reinforcement 41. Further, the second through-holes 52a of the second bottom wall 52 face the first through-holes 42a of the first reinforcement 41.

The second side walls 53 are placed along the first side walls 43 of the first reinforcement 41. The second reinforcement 51 is joined such that the second side walls 53 are welded to the first side walls 43 of the first reinforcement 41. Further, the second flange 54 of the second reinforcement 51 is joined to the joining surface 24 of the inner panel 21 by welding at a position that does not overlap with the first flange 44.

The outer panel 31 is joined to the joining surface 24 of the inner panel 21, and a closed-section structure H formed by the outer panel 31 and the inner panel 21 is formed on each side of the window frame portion 22 along the vehicle width direction. In the closed-section structure H of the present embodiment, the first reinforcement 41 and the second reinforcement 51 serve as reinforcing members having through-holes. The outer panel 31 placed on the side closer to the outside of the vehicle than the second reinforcement 51 that is one of the reinforcing members constitutes a first panel, and the inner panel 21 placed on the side closer to the inside of the vehicle than the first reinforcement 41 that is the other one of the reinforcing members constitutes a second panel.

The internal space S is sectioned in the closed-section structure H, and the internal space S is filled with the high-rigidity foaming adhesive member 61. The high-rigidity foaming adhesive member 61 is made of an epoxy-based foam material and constitutes a foam layer to have necessary rigidity and adhesiveness.

Figure 4:
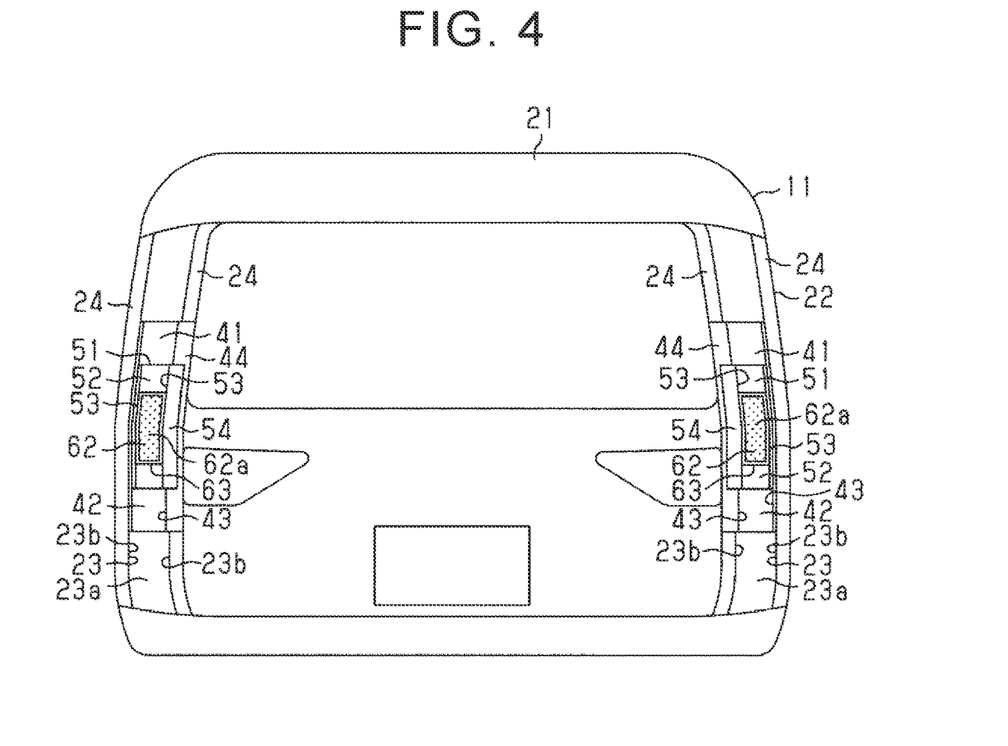
FIG. 4 is a front view illustrating a state where a precursor of a high-rigidity foaming adhesive member is placed.
Figure 5:
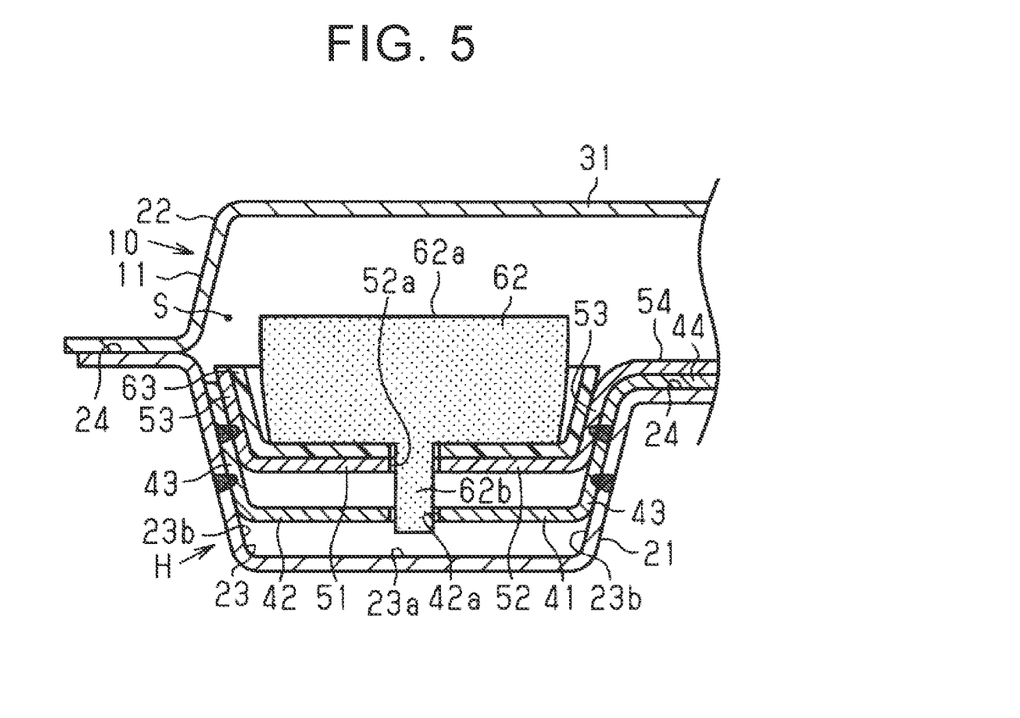
FIG. 5 is a sectional view illustrating a state where the precursor of the high rigidity foaming adhesive member is placed.

The high-rigidity foaming adhesive member 61 is formed such that its precursor 62 is heated to foam. As illustrated in FIG. 4 or FIG. 5, the precursor 62 includes an elongated block-shaped body portion 62a extending in the vehicle up-down direction, and bar-shaped leg portions 62b provided to extend from the body portion 62a. The body portion 62a is placed inside the second reinforcement 51, and the leg portions 62b are inserted into the second through-holes 52a and the first through-holes 42a. The precursor 62 of the high-rigidity foaming adhesive member 61 is held by a generally plate-shaped resin holding member 63 in an integrated manner. The precursor 62 is attached to the second reinforcement 51 with locking portions (not shown) such as clips formed in the holding member 63. Note that the number of locking portions and positions where the locking portions are provided are determined in accordance with the shape of the second reinforcement 51. In a state where the precursor 62 is placed inside the second reinforcement 51, the precursor 62 is attached to the second reinforcement 51 with the locking portions. The precursor 62 is placed in a state where the holding member 63 is provided between the body portion 62a and the second bottom wall 52 of the second reinforcement 51.

Here, a manufacturing method of the reinforcing structure for the back door 10 will be described. First, the first reinforcement 41 is joined to the inner panel 21, and the second reinforcement 51 is joined to the first reinforcement 41. Then, the precursor 62 is placed in the second reinforcement 51, and the precursor 62 is attached to the second reinforcement 51 with the locking portions of the holding member 63. At this time, the leg portions 62b of the precursor 62 are inserted into the second through-holes 52a of the second reinforcement 51 and the first through-holes 42a of the first reinforcement 41. After that, the outer panel 31 is joined to the inner panel 21. As a result, the closed-section structure H is formed by the inner panel 21 and the outer panel 31, and the precursor 62 is placed in the internal space S of the closed-section structure H.

As illustrated in FIG. 5, in a state where the precursor 62 is placed in the internal space S, there is a space between the precursor 62 and the outer panel 31. Further, the second bottom wall 52 of the second reinforcement 51 and the first bottom wall 42 of the first reinforcement 41 are placed with a space, except parts where the leg portions 62b are provided. Also, the first bottom wall 42 and the inner panel 21 are placed with a space.

Subsequently, a coating step is performed on the back door 10, and a drying step is performed after that. In the drying step, when the back door 10 is heated to 150° C. to 200° C., the precursor 62 is heated by heat at the time of drying. As a result, the precursor 62 foams.

The body portion 62a of the precursor 62 thus foaming buries a part between the second bottom wall 52 and the outer panel 31 in the internal space S. Further, the leg portions 62b of the precursor 62 thus foaming enter a part between the second bottom wall 52 and the first bottom wall 42 and also enter a part between the first bottom wall 42 and the bottom face 23a of the inner panel 21, so that the internal space S of the closed-section structure H is filled with the foamed precursor 62. The precursor 62 hardens in that state to become the high-rigidity foaming adhesive member 61, so that the reinforcing structure for the back door 10 is completed.

As illustrated in FIG. 2, in the reinforcing structure for the back door 10, a part of the high-rigidity foaming adhesive member 61 is filled between the outer panel 31 and the second reinforcement 51 so as to bond the outer panel 31 to the second reinforcement 51. Further, a part of the high-rigidity foaming adhesive member 61 penetrates through the second through-holes 52a of the second reinforcement 51 and is filled between the second bottom wall 52 of the second reinforcement 51 and the first bottom wall 42 of the first reinforcement 41, so as to bond the second bottom wall 52 to the first bottom wall 42. Further, the high-rigidity foaming adhesive member 61 penetrates through the first through-holes 42a of the first reinforcement 41, so as to bond the first bottom wall 42 of the first reinforcement 41 to the bottom face 23a of the inner panel 21.

The high-rigidity foaming adhesive member 61 bonds the outer panel 31 to the inner panel 21 and is provided in a column shape between the outer panel 31 and the inner panel 21 so as to reinforce the vicinity of the bending portion 14 of the back door 10. That is, the high-rigidity foaming adhesive member 61 is provided in a column shape along a joining direction where the inner panel 21 and the outer panel 31 are joined to each other, so that the high-rigidity foaming adhesive member 61 reinforces the vicinity of the bending portion 14 of the window frame portion 22. Further, in the closed-section structure H, the first bottom wall 42 of the first reinforcement 41 and the second bottom wall 52 of the second reinforcement 51 are adjacently provided in the joining direction where the outer panel 31 and the inner panel 21 are joined to each other. Accordingly, in the closed-section structure H, the first bottom wall 42, the second bottom wall 52, and a part of the high-rigidity foaming adhesive member 61 are laminated along the joining direction.

Next will be described the action of the reinforcing structure for the back door 10. In the back door 10, the vicinity of the bending portion 14 of the window frame portion 22 is reinforced by the first reinforcement 41 and the second reinforcement 51 and is also reinforced by the high-rigidity foaming adhesive member 61, so that the rigidity is increased.

Further, the back door 10 has a shape in which a part below the bending portion 14 easily slightly vibrates in the vehicle front-rear direction around the bending portion 14 as a pivoting origin, and besides, the back door 10 is made of a material such as aluminum that has a Young's modulus smaller than that of an iron-based material. However, the high-rigidity foaming adhesive member 61 is bonded to the inner panel 21 and the outer panel 31 so that the panels 21, 31 are connected to each other with the high-rigidity foaming adhesive member 61, thereby restraining slight vibrations of the inner panel 21 and the outer panel 31.

Figure 6:
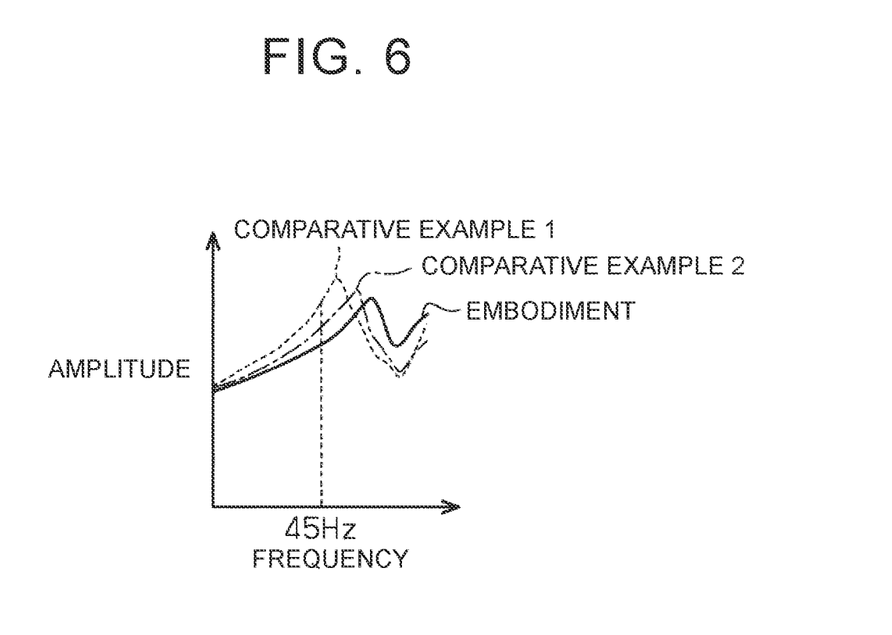
FIG. 6 is a graph illustrating a relationship between frequency and sound pressure.

When an external force is applied to a vehicle body of the vehicle or the back door 10 at the time when the vehicle runs or the back door 10 is opened and closed, natural vibrations in which vibrations continue due to an internal force occur. In the graph in FIG. 6, the vibration characteristic of the back door 10 in the embodiment is indicated by a continuous line, and the vibration characteristic of a back door in Comparative Example 1 in which the closed-section structure H is not filled with the high-rigidity foaming adhesive member 61 is indicated by a broken line. Further, in the graph in FIG. 6, an alternate long and short dash line indicates the vibration characteristic of a back door in Comparative Example 2 in which the closed-section structure H is filled with the high-rigidity foaming adhesive member 61 and only the second reinforcement 51 and the outer panel 31 are bonded to each other with the high-rigidity foaming adhesive member 61. In Comparative Example 2, the high-rigidity foaming adhesive member 61 does not penetrate through the first reinforcement 41 and the second reinforcement 51. In the graph of FIG. 6, the lateral axis indicates frequency, and the vertical axis indicates magnitude of a sound pressure.

As illustrated by the continuous line in FIG. 6, in the present embodiment, the reinforcing structure is provided, so that the natural frequency of the back door 10 is higher than those in Comparative Example 1 and Comparative Example 2. The natural frequency of the vehicle body is around 45 Hz, and thus, the natural frequency of the back door 10 in the embodiment is greatly separated from the natural frequency of the vehicle body in comparison with Comparative Example 1 and Comparative Example 2, so that resonance between the vehicle body and the back door 10 is avoided more.

With the embodiment, it is possible to yield the following effects.

(1) The high-rigidity foaming adhesive member 61 penetrates through the first through-holes 42a and the second through-holes 52a, so that the inner panel 21 and the outer panel 31 are bonded to each other with the high-rigidity foaming adhesive member 61. Accordingly, even in the reinforcing structure in which the first and second reinforcements 41, 51 are placed between the inner panel 21 and the outer panel 31, the inner panel 21 and the outer panel 31 can be bonded to each other via the high-rigidity foaming adhesive member 61. In addition, the high-rigidity foaming adhesive member 61 can be filled between the second reinforcement 51 and the first reinforcement 41 and between the first reinforcement 41 and the inner panel 21. As a result, even in the vicinity of the bending portion 14 in which the closed-section structure H has a small sectional area, it is possible to increase the rigidity without adding reinforcements or without increasing the plate thicknesses of the panels 21, 31 and the reinforcements 41, 51.

(2) The back door 10 is configured such that the vicinity of the bending portion 14 of the window frame portion 22 is filled with the high-rigidity foaming adhesive member 61 to increase the rigidity, thereby restraining slight vibrations of the back door 10. On this account, the natural frequency of the back door 10 can be greatly separated from the natural frequency of the vehicle body, thereby making it possible to avoid resonance between the vehicle body and the back door 10.

(3) With the first through-holes 42a and the second through-holes 52a, the first reinforcement 41 can be bonded to the second reinforcement 51 and the first reinforcement 41 can be bonded to the inner panel 21 both with the high-rigidity foaming adhesive member 61. On this account, even if the inner panel 21 cannot be welded to the first bottom wall 42 of the first reinforcement 41, the inner panel 21 can be joined to the first reinforcement 41 with the high-rigidity foaming adhesive member 61, thereby making it possible to increase the rigidity.

(4) Since the high-rigidity foaming adhesive member 61 is provided between the inner panel 21 and the outer panel 31, the high-rigidity foaming adhesive member 61 increases the rigidity in the joining direction where the inner panel 21 and the outer panel 31 are joined to each other. On this account, it is possible to increase the rigidity of the closed-section structure H in a direction where the closed-section structure H is easily crushed.

(5) In the drying step after the coating step, the precursor 62 of the high-rigidity foaming adhesive member 61 is heated to foam, so that the precursor 62 expanding in volume is filled into the internal space S of the closed-section structure H. On this account, the high-rigidity foaming adhesive member 61 can be filled into a narrow space such as a space between the second reinforcement 51 and the first reinforcement 41 or a space between the first reinforcement 41 and the inner panel 21. Further, in consideration of the sealing characteristic of the back door 10, even the bottom face 23a of the inner panel 21 and the first bottom wall 42 of the first reinforcement 41 that cannot be welded can be bonded to each other with the high-rigidity foaming adhesive member 61.

(6) The inner panel 21, the first reinforcement 41, and second reinforcement 51 are made of aluminum, and therefore, these three members cannot be welded collectively, so that it is difficult to increase the rigidity by increasing the number of welding parts. However, by filling the high-rigidity foaming adhesive member 61, the inner panel 21, the first reinforcement 41, and the second reinforcement 51 can be integrated by bonding, so that the rigidity of the back door 10 can be increased.

(7) In order to reduce the weight of the back door 10, the inner panel 21, the outer panel 31, the first reinforcement 41, and the second reinforcement 51 are made of aluminum. Aluminum has a Young's modulus smaller than that of an iron-based material. The high-rigidity foaming adhesive member 61 is filled into the internal space S, so that the inner panel 21, the first reinforcement 41, the second reinforcement 51, and the outer panel 31 are bonded to each other. Hereby, slight vibrations can be restrained. As a result, it is possible to greatly separate the natural frequency of the back door 10 from the natural frequency of the vehicle body, thereby making it possible to avoid resonance between the vehicle body and the back door 10 and to reduce noise and vibration that an occupant feels inside a vehicle cabin.

Note that the above embodiment can be modified as follows.

Figure 7:
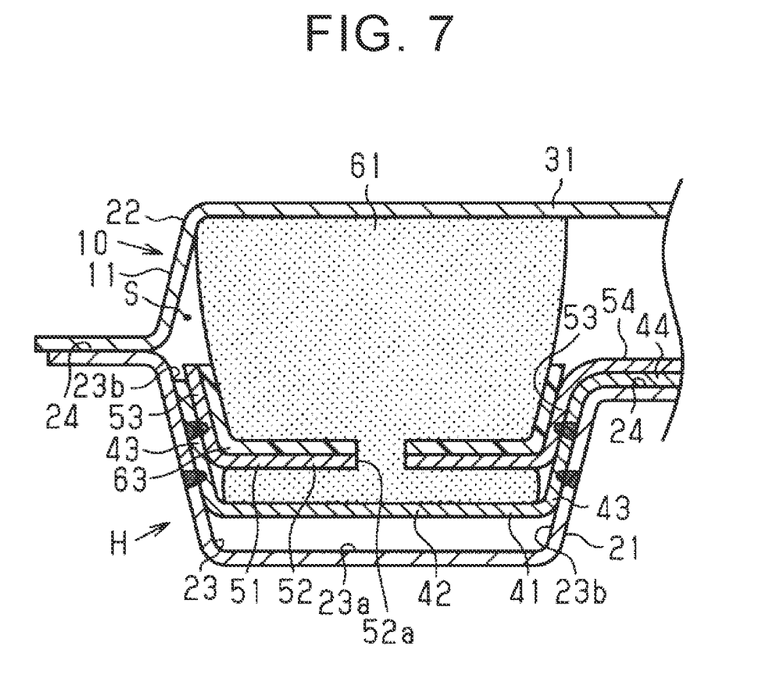
FIG. 7 is a sectional view illustrating a reinforcing structure of another example.

As illustrated in FIG. 7, the second through-holes 52a are formed only in the second bottom wall 52 of the second reinforcement 51, and the first through-holes 42a are not formed in the first reinforcement 41. Then, the second reinforcement 51 having the second through-holes 52a is provided as a reinforcing member, the outer panel 31 placed on the side closer to the outside of the vehicle than the second reinforcement 51 is provided as a first panel, and the first reinforcement 41 placed on the side closer to the inside of the vehicle than the second reinforcement 51 is provided as a second panel. Then, the high-rigidity foaming adhesive member 61 is provided to penetrate through the second through-holes 52a of the second reinforcement 51, and hereby, a structure in which the outer panel 31 is bonded to the first reinforcement 41 with the high-rigidity foaming adhesive member 61 may be formed. Even in such a configuration, the high-rigidity foaming adhesive member 61 is provided between the outer panel 31 and the first reinforcement 41, so that the rigidity of the closed-section structure H can be increased.

Although not illustrated herein, the first through-holes 42a are formed only in the first bottom wall 42 of the first reinforcement 41, and the second through-holes 52a are not formed in the second reinforcement 51. Then, the first reinforcement 41 having the first through-holes 42a is provided as a reinforcing member, the second reinforcement 51 provided on the side closer to the outside of the vehicle than the first reinforcement 41 is provided as a first panel, and the inner panel 21 provided on the side closer to the inside of the vehicle than the first reinforcement 41 is provided as a second panel. Then, the high-rigidity foaming adhesive member 61 is provided to penetrate through the first through-holes 42a of the first reinforcement 41, so that a structure in which the inner panel 21 is bonded to the second reinforcement 51 with the high-rigidity foaming adhesive member 61 may be formed. Even in such a configuration, the high-rigidity foaming adhesive member 61 is provided between the inner panel 21 and the second reinforcement 51, so that the rigidity of the closed-section structure H can be increased.

In a case where a side panel having a design surface is placed on the side closer to the inside of the vehicle than the inner panel 21, for example, in the embodiment, a through-hole may be provided in the inner panel 21, and the high-rigidity foaming adhesive member 61 may be provided to penetrate through the second through-holes 52a, the first through-holes 42a, and the through-hole provided in the inner panel 21, so that the side panel is bonded to the outer panel 31 with the high-rigidity foaming adhesive member 61. In this case, the inner panel 21, the first reinforcement 41, and the second reinforcement 51 serve as reinforcing members, the outer panel 31 placed on the side closer to the outside of the vehicle than the second reinforcement 51 serves as a first panel, and the side panel placed on the side closer to the inside of the vehicle than the inner panel 21 serves as a second panel.

In the embodiment, the first through-holes 42a are provided in the first bottom wall 42 of the first reinforcement 41, and the second through-holes 52a are provided in the second bottom wall 52 of the second reinforcement 51, but the places where the through-holes are provided may be changed. For example, through-holes may be provided in the first side wall 43 of the first reinforcement 41, and the high-rigidity foaming adhesive member 61 penetrating through the first side wall 43 may be bonded to the side face 23b of the inner panel 21. Alternatively, through-holes may be provided in the second side wall 53 of the second reinforcement 51, and the high-rigidity foaming adhesive member 61 penetrating through the second side wall 53 may be bonded to the first side wall 43 of the first reinforcement 41.

Even in this case, the rigidity of the closed-section structure H can be increased by the high-rigidity foaming adhesive member 61.

The reinforcing structure may be applied to members other than the back door 10. For example, the reinforcing structure may be applied to a vehicle body framework portion having a closed-section structure formed by joining an outer panel and an inner panel, e.g., a front pillar, a center pillar, a rear pillar, a roof side rail, or the like.

Only one reinforcement may be placed in the internal space S of the closed-section structure H. In this case, the one reinforcement serves as a reinforcing member, the outer panel 31 serves as a first panel, and the inner panel 21 serves as a second panel.

In the embodiment, the heating of the precursor 62 is performed in the heating step after the coating step in the manufacturing process of the back door 10, but the disclosure is not limited to this. For example, the heating may be performed after the inner panel 21, the first reinforcement 41, the second reinforcement 51, the precursor 62, and the outer panel 31 are assembled, but before the coating step is performed.

The material for the inner panel 21, the first reinforcement 41, and the second reinforcement 51 may be a metal other than aluminum.

What is claimed is:

1. A vehicle body reinforcing structure comprising:
    a reinforcing member having a through-hole penetrating through the reinforcing member in a plate-thickness direction of the reinforcing member, the reinforcing member being located inside a closed-section structure of a vehicle body framework portion of a vehicle, the reinforcing member being panel-shaped;
    a first panel located at a position closer to an outside of the vehicle than the reinforcing member is;
    a second panel constituting the closed-section structure together with the first panel, the second panel being located at a position closer to an inside of the vehicle than the reinforcing member is; and
    a foaming adhesive member filled in an internal space of the closed-section structure, wherein
    the first panel and the second panel are bonded to each other by the foaming adhesive member penetrating through the through-hole of the reinforcing member, and the foaming adhesive member is filled, in the internal space, between the first panel and the reinforcing member and between the second panel and the reinforcing member.

2. The vehicle body reinforcing structure according to claim 1, wherein:
the reinforcing member, the first panel, and the second panel are arranged along a joining direction in which the first panel and the second panel are joined to each other; and
the foaming adhesive member extends along the joining direction between the first panel and the second panel.

3. The vehicle body reinforcing structure according to claim 1, wherein the first panel is an outer panel, the second panel is an inner panel, and the reinforcing member is a reinforcement.

4. The vehicle body reinforcing structure according to claim 3, wherein the vehicle body reinforcing structure includes a plurality of the reinforcements.

5. A manufacturing method of a vehicle body reinforcing structure comprising:
(a) placing a first panel, with a predetermined space between the first panel and a reinforcing member, at a position closer to an outside of a vehicle than the reinforcing member is, the reinforcing member being panel-shaped, the reinforcing member having a through-hole penetrating through the reinforcing member in a plate-thickness direction of the reinforcing member, and the reinforcing member being placed inside a closed-section structure of a vehicle body framework portion of the vehicle;
(b) placing a second panel, with a predetermined space between the second panel and the reinforcing member, at a position closer to an inside of the vehicle than the reinforcing member is;
(c) forming the closed-section structure, by step (a) and step (b), the second panel constituting the closed-section structure together with the first panel;
(d) placing a precursor of a foaming adhesive member in an internal space of the closed-section structure;
(e) after step (d), heating the precursor to foam; and
(f) after step (e), causing the precursor to penetrate through the through-hole such that the foaming adhesive member is filled between the reinforcing member and the first panel and between the reinforcing member and the second panel.

* * * * *